E. ROBERTSON.
HARD ROAD CONSTRUCTION.
APPLICATION FILED OCT. 3, 1914.
1,127,518.
Patented Feb. 9, 1915.
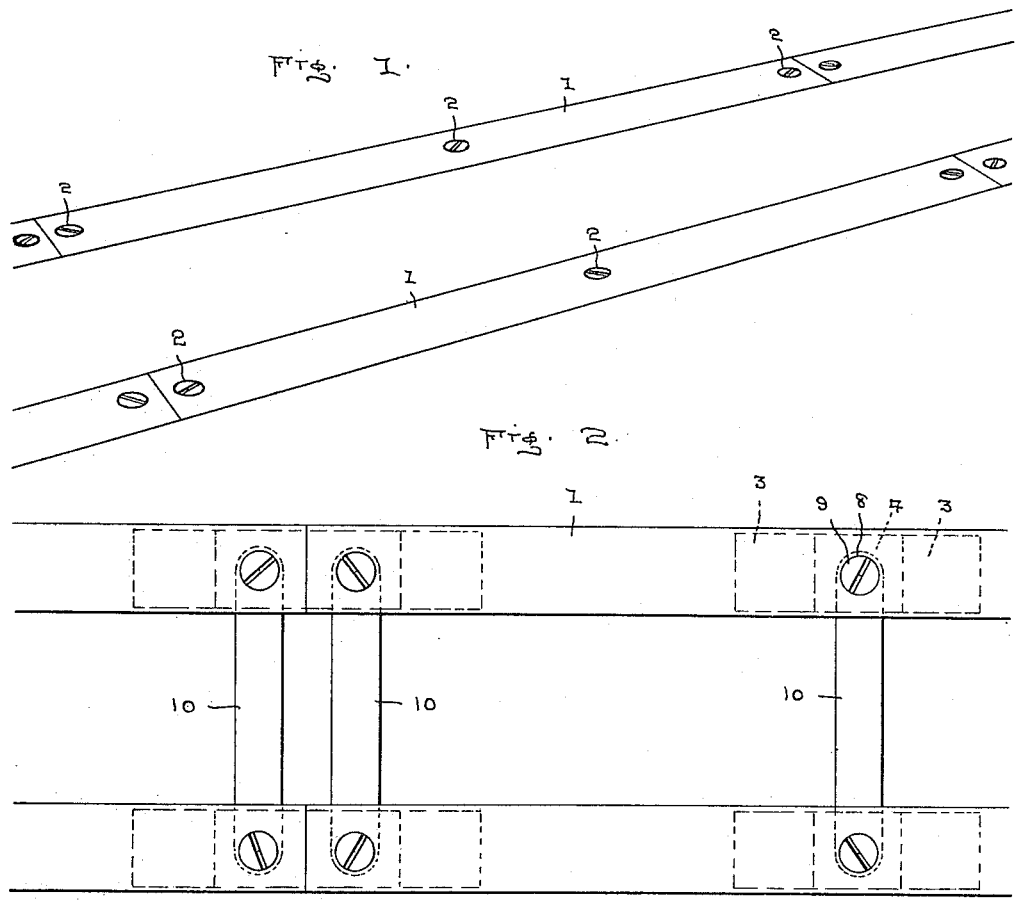
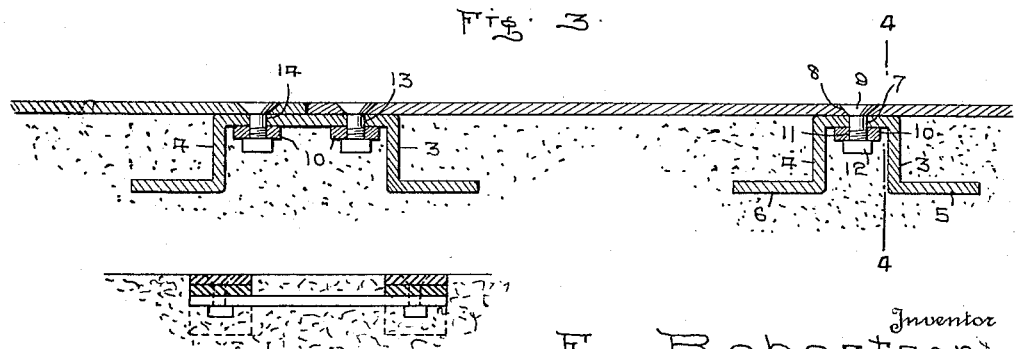

UNITED STATES PATENT OFFICE.

EDWIN ROBERTSON, OF FAIRMOUNT, ILLINOIS.

HARD-ROAD CONSTRUCTION.

1,127,518.  Specification of Letters Patent.  Patented Feb. 9, 1915.

Application filed October 3, 1914.  Serial No. 864,747.

*To all whom it may concern:*

Be it known that I, EDWIN ROBERTSON, a citizen of the United States, residing at Fairmount, in the county of Vermilion and State of Illinois, have invented certain new and useful Improvements in Hard-Road Construction; and I do hereby declare the following to be a full, clear, and exact description of the invention, such as will enable others skilled in the art to which it appertains to make and use the same.

This invention relates to hard roads, and in particular to hard road construction especially adapted for automobiles.

One of the objects of this invention is to provide an arrangement whereby a track for the tires of an automobile is provided which is flush with the surface of the road.

Another object of this invention is to provide an automobile track out of stock in ordinary commercial use and without special construction.

Another object of this invention is to provide an arrangement whereby the tracks are thoroughly supported and braced.

Other objects and advantages of this invention will be hereinafter more clearly set forth in the specification and pointed out in the claims.

Similar characters of reference refer to similar parts throughout the specification and drawings, in which, Figure 1 is a perspective view of this device in completed formation, Fig. 2, a top plan view thereof, and Fig. 3, a longitudinal sectional view through one of the track members and showing the means of connecting the bracing and supporting members. Fig. 4 is transverse sectional view of the road construction as shown in Fig. 2.

In Fig. 1 of the drawings, 1 is a track member composed of a flat metallic strip having at their end portions, and at suitable intervals therebetween, counter-sunk apertures thereto. The rails are supported by means of angular yoke members 3 consisting of a channel-shaped portion 4 and oppositely disposed and outturned flange sections 5, said channel portion having a suitable aperture 7 disposed therethrough, and said aperture 7 registering with one of the counter-sunk apertures 2 in the track 1. A screw bolt 8 is seated through said apertures, the head portion 9 of which is seated in the counter-sunk portion of the aperture 2 so that the upper surface thereof results flush with the upper surface of the track 1. A transverse bracing member 10 having suitable apertures 11 near each end portion is mounted upon the end portion of the screw bolt 8, said devices being locked into assembled position by means of a nut 12, as plainly shown in Fig. 3 of the drawings.

The channel portion 4 of the supporting member 3, which supports the end portions of the flat rails 1 flush with each other, is slightly lengthened and contains two apertures 13 and 14 therethrough, and each of said rails is locked upon said supporting member 3 and braced by bracing members 10 the same as previously described.

The tracks are embedded flush with the road bed, said road bed being preferably of concrete, or can be, if desired, macadam, crushed stone, or simply dirt road bed, and the bracing members and supporting members are buried within the road bed material. If desired, the surface of the road bed can be elevated an inch or two above the surface of the tracks 1 to thereby form flange members or guides to retain the wheels of the automobile upon the tracks. This arrangement allows of a construction cheap, simple, and durable, and one easily built, besides giving a road construction that allows of a very comfortable and convenient use.

Having now described my invention, what I claim as new and desire to secure by Letters Patent, is:—

1. A device of the character described comprising; a hard road construction, a plurality of flat track members consisting of metallic sheet material embedded flush with the surface of said road bed, channel iron supporting members having outturned flange edges embedded in said road construction and supporting said track members, bracing members connecting each pair of supporting members, means seating flush with the surface of said track members and mounted through said supporting members, and bracing members, and means locking said device in assembled position.

2. A device of the character described comprising; a road construction, a flat metallic track member, a supporting member consisting of a channel portion and oppositely disposed flange portions supporting said track members, bracing members connecting each of said supporting members in pairs, said track members, said supporting members and said bracing members having registering apertures, and means mounted through said registering apertures to lock said device in assembled formation.

3. A device of the character described, comprising; a hard road construction adapted to act as a guide to the wheels of an automobile, a plurality of supporting members buried within said road construction, each supporting member consisting of a channel portion having a central aperture therethrough and oppositely disposed flange portions, a bracing member having apertures in their end portions connected to the under side of the channel portion of said supporting members connecting them in pairs, flat metallic track members mounted upon the upper surface of said channel portions of said supporting members and flush with the surface of the road construction having counter-sunk apertures therethrough registering with the apertures in said channel portions, and means mounted through said apertures and locking said track members into braced and supported construction.

In testimony whereof I have signed my name to this specification in the presence of two subscribing witnesses.

EDWIN ROBERTSON.

Witnesses:
L. C. ZIERJACK,
LOUIS J. ZIERJACK.

Copies of this patent may be obtained for five cents each, by addressing the "Commissioner of Patents, Washington, D. C."